(12) United States Patent
Nojima

(10) Patent No.: US 7,193,776 B2
(45) Date of Patent: Mar. 20, 2007

(54) SCREEN

(75) Inventor: Shigeo Nojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 10/998,997

(22) Filed: Nov. 30, 2004

(65) Prior Publication Data

US 2005/0136365 A1   Jun. 23, 2005

(30) Foreign Application Priority Data

Dec. 18, 2003  (JP) .............................. 2003-420960

(51) Int. Cl.
*G03B 21/60* (2006.01)
*G03B 21/56* (2006.01)
(52) U.S. Cl. .................. 359/452; 359/459; 359/443
(58) Field of Classification Search ................ 359/452, 359/443, 459, 619
See application file for complete search history.

(56) References Cited

U.S. PATENT DOCUMENTS

2004/0100692 A1 * 5/2004 Hou ........................... 359/452

FOREIGN PATENT DOCUMENTS

| JP | A 05-011348 | 1/1993 |
|---|---|---|
| JP | A 05-045733 | 2/1993 |
| JP | A 05-045734 | 2/1993 |
| JP | A 05-072630 | 3/1993 |
| JP | A 06-289491 | 10/1994 |
| JP | A 07-261274 | 10/1995 |
| JP | A 07-270915 | 10/1995 |
| JP | A-2002-162691 | 6/2002 |
| WO | WO2003/050612 | 6/2003 |

* cited by examiner

*Primary Examiner*—Diane Lee
*Assistant Examiner*—Robert C. Do
(74) *Attorney, Agent, or Firm*—Oliff & Berridge, PLC

(57) ABSTRACT

A screen includes a reflecting layer, a reflecting layer, a reflecting layer and a base material in the order of description from the light incidence side, wherein the reflecting layer, reflecting layer, and reflecting layer reflect the R light, G light, and B light which are the lights in specific wavelength regions and transmit outer light which is the light in the other wavelength region different from the specific wavelength region.

6 Claims, 5 Drawing Sheets

SCREEN

BACKGROUND OF THE INVENTION

1. Field of Invention

Exemplary aspects of the present invention relates to a screen, more particularly to a screen for a projector.

2. Description of Related Art

Matte screens and bead screens have been used as related art screens for projectors. See JP-A-5-11348 and JP-A-5-45734. In a Matte screen, for example, a white Matte screen, a coating material having a glass powder or shell powder admixed thereto is coated on the screen surface. As a result, the Matte screens have a high capacity of diffusing the reflected light and a high qualitative presentation ability. For this reason, Matte screens have been used in movie theaters. In bead screens, bead-like glass is coated on the screen surface. The bead screens, by contrast with the Matte screens, have a high capacity of reflecting the incident light in a specific direction, specifically, the so-called gain thereof is high, and are suitable for business applications or home theaters.

SUMMARY OF THE INVENTION

However, Matte screens and bead screens have the following drawbacks. First, Matte screens also diffuse unnecessary outer light, for example, illumination light or daylight (sunlight). The resultant problem is that the unnecessary noise light is reflected toward the viewer over almost the entire wavelength region of visual light. The problem associated with the bead screens is that when they are used in an environment with a brightness which is not sufficiently low, the contrast of the projected image is decreased by the outer light falling on the screen.

With the foregoing in view, exemplary aspects of the present invention provide a screen capable of constantly providing high-contrast projected images.

In order to address or resolve the above-described and/or other problems, the first exemplary aspect of the present invention provides a screen including a reflecting layer and a base material in the order of description from the light incidence side. The reflecting layer reflects the light in a specific wavelength region and transmits the light in other wavelength regions different from the specific wavelength region.

In accordance with an exemplary aspect of the present invention, the reflecting layer reflects the light in a specific wavelength region. Let us consider the so-called front screen, specifically, a case where a projected light from a projector is projected on the screen. In this case, the light in a specific wavelength region necessary to form a full-color image, of the light projected on the screen, is reflected toward the viewer. Further, the reflecting layer transmits the light in other wavelength regions different from the specific wavelength region. As a result, of the unnecessary outer light falling on the screen, the components in the other wavelength regions can be transmitted to the side opposite to the viewer. Here, examples of the unnecessary outer light include indoor illumination light or sunlight entering through the windows. The unnecessary outer light generally has a spectral distribution over a wide wavelength region, specifically, a spectral distribution close to a white light. As a result, the quantity of outer light reflected from the screen can be greatly reduced by comparison with related art screens. Furthermore, the projected light from the projector can be reflected toward the viewer with good efficiency.

Therefore, in accordance with an exemplary aspect of the present invention, a high-contrast projected image can be constantly obtained.

Further, in an exemplary aspect of the present invention, the reflecting layer may be formed on the surface of a plurality optically transparent beads and that the beads be almost uniformly distributed on a base material. As a result, in addition to displaying a high-brightness projected image on the bead screen itself, a projected image of even higher contrast can be obtained.

Further, in an exemplary aspect of the present invention, the reflecting layer may be composed of a first reflecting layer, a second reflecting layer, and a third reflecting layer. The first reflecting layer reflects a first color light and transmits a second color light and a third color light. The second reflecting layer reflects the second color light and transmits the first color light and the third color light. The third reflecting layer reflects the third color light and transmits the first color light and the second color light, and the three layers, specifically, the first reflecting layer, second reflecting layer, and third reflecting layer, are formed on the surface of one bead. As a result, the lights in three wavelength regions, which are necessary to form a full-color image, can be reflected toward the viewer by the three layers. Specifically, first reflecting layer, second reflecting layer, and third reflecting layer, formed on one bead. Furthermore, of the unnecessary outer light falling on the beads, the components other than the first color light, second color light, and third color light can be transmitted to the opposite side, As a result, the quantity of outer light reflected from the screen can be greatly reduced by comparison with that of the related art technology.

Further, in an exemplary aspect of the present invention, the reflecting layer may be composed of a first reflecting layer, a second reflecting layer, and a third reflecting layer. The first reflecting layer reflects a first color light and transmits a second color light and a third color light, the second reflecting layer reflects the second color light and transmits the first color light and the third color light, the third reflecting layer reflects the third color light and transmits the first color light and the second color light. The first reflecting layer is formed on the surface of the first bead. The second reflecting layer is formed on the surface of the second bead, and the third reflecting layer is formed on the surface of the third bead. In this aspect, each bead has formed thereon only one reflective layer to reflect light in a wavelength region different from that of other layers. As a result, reflecting layers can be easily formed on the beads.

Further, in an exemplary aspect of the present invention, the beads may be provided in a plurality of layers. In this case, beads are randomly distributed in the layers laminated in the screen surface. As a result, the projected light randomly illuminates the beads in the process of passing through the laminated layers. Therefore, the first color light, second color light, and third color light can be reflected almost uniformly.

Further, an exemplary aspect of the present invention, the reflecting layer may be composed of a dielectric multilayer film. The dielectric multilayer film is obtained by laminating materials with different refractive indexes at the prescribed thickness. As a result, the reflection characteristic or transmission characteristic of the screen can be almost matched, for example, with the radiation spectrum characteristic of the projector light source.

Further, a second exemplary aspect of the invention provides a screen to project a projected light composed of a first color light, a second color light, and a third color light from a projector. The screen includes a reflecting layer and a base material in the order of description from the light incidence side. The reflecting layer is composed of a first reflecting layer, a second reflecting layer, and a third reflecting layer. The first reflecting layer reflects a first color light and transmits a second color light and a third color light. The second reflecting layer reflects the second color light and transmits the first color light and the third color light, and the third reflecting layer reflects the third color light and transmits the first color light and the second color light.

As a result, the screen reflects the light in a wavelength region corresponding to the spectral distribution of the projected light from the projector toward the viewer. Of the outer light, such as white light that is not limited to the spectral distribution, the components other than the first color light, second color light, and third color light are transmitted to the side opposite to the viewer. Therefore, a high-contrast projected image can be obtained without loosing the color rendering capacity of the projector.

BRIEF DESCRIPTION OF THE DRAWINGS

FIG. 4-1 is a graph of a spectral distribution of the projected light;

FIG. 4-2 is a graph of a reflection factor of the screen;

DETAILED DESCRIPTION OF PREFERRED EMBODIMENTS

Examples of the screen in accordance with exemplary aspects the present invention will be explained hereinbelow in greater detail based on the appended drawings. The present invention is, however, not limited to those examples.

Exemplary Embodiment 1

Figure 1:
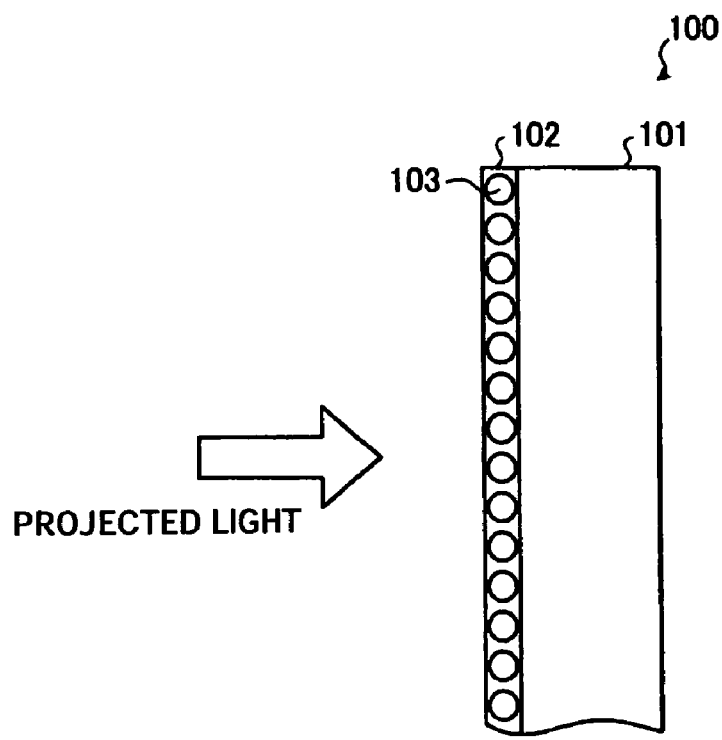
FIG. 1 shows a schematic of a screen of exemplary embodiment 1.

FIG. 1 shows a schematic of a screen 100 of Example 1. The screen is composed of a bead layer 102 and a base material 101 in the order of description from the projected light incidence side. The bead layer 102 is so formed that a plurality of beads 103 are dispersed almost uniformly in a random fashion.

Figure 2:
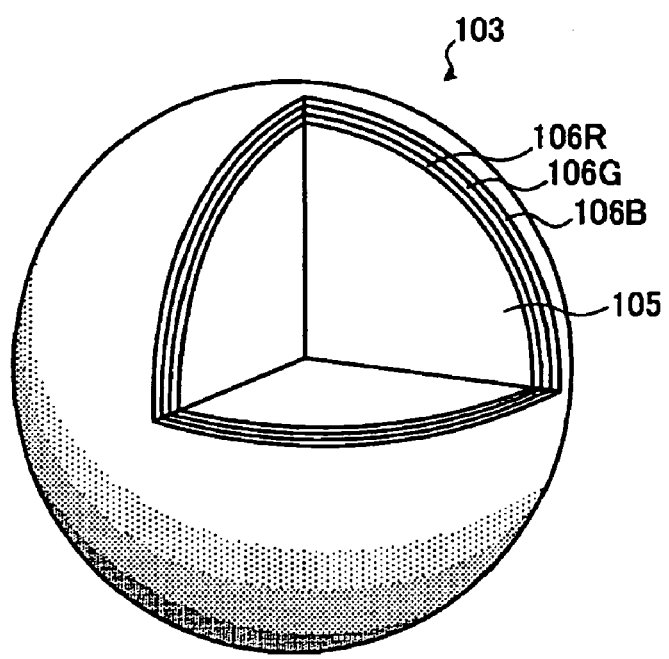
FIG. 2 shows a schematic of a bead of exemplary embodiment 1.

FIG. 2 shows a schematic of one bead 103. The bead 103 is in the form of a sphere with a diameter from one to several tens of microns. The bead has a core portion 105 composed of an optical glass or optically transparent resin. Three layers, specifically, a first reflecting layer 106R, second reflecting layer 106G, and third reflecting layer 106B, are formed in the order of description from the side of the core portion 105. The first reflecting layer 106R reflects the red light (hereinbelow "R light") which is the first color light and transmits the green light (hereinbelow "G light") which is the second color light and the blue light (hereinbelow "B light") which is the third color light. The second reflecting layer 106G reflects the G light and transmits the R light and B light. The third reflecting layer 106B reflects the B light and transmits the R light and G light. The first reflecting layer 106R, second reflecting layer 106G, and third reflecting layer 106B are formed from respective dielectric multilayer films and have a function identical to that of a dichroic mirror. The dielectric multilayer film is obtained by laminating materials with different refractive indexes at the prescribed thickness. As a result, the reflection characteristic or transmission characteristic of the light in the desired wavelength region can be freely controlled.

Thus, in the present exemplary embodiment, the reflecting layer is composed of the first reflecting layer 106R, second reflecting layer 106G, and third reflecting layer 106B. Further, the reflecting layer, as described hereinabove, has a function of reflecting the light in a specific wavelength region and transmitting the light in other wavelength regions different from the specific wavelength region. In the present exemplary embodiment, the light in three wavelength regions necessary to form a full-color image can be reflected to the viewer by the three layers, specifically, the first reflecting layer 106R, second reflecting layer 106G, and third reflecting layer 106B, that were formed on one bead 103.

Further, the beads 103 are disposed without gaps, so that they are almost uniformly and randomly distributed in a monolayer bead layer 102. The beads 103 are fixedly attached to the base material 101 with an optically transparent adhesive.

Figure 3:
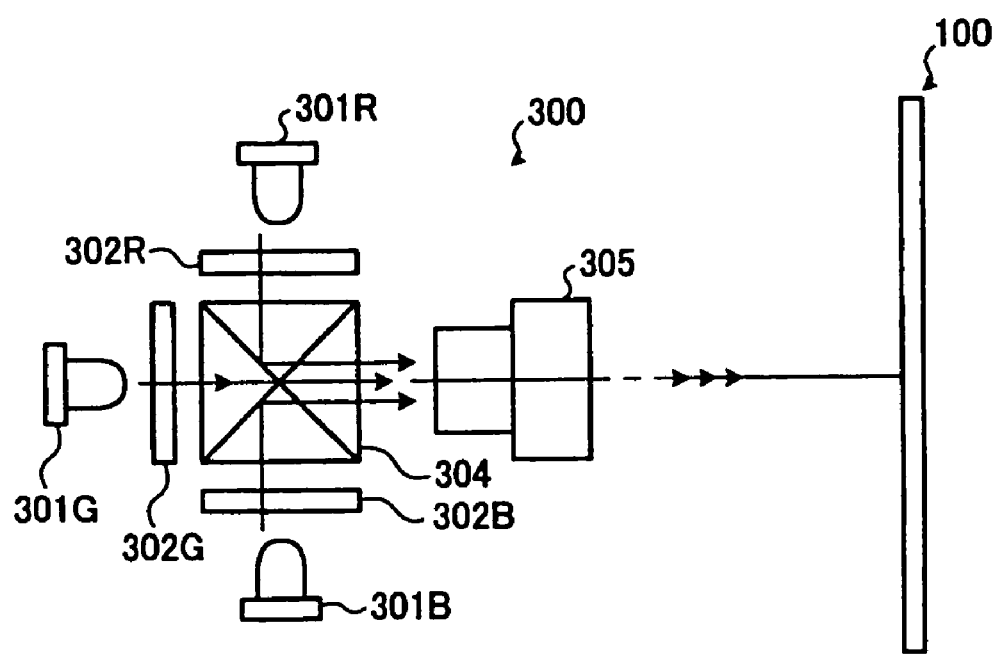
FIG. 3 is a schematic of a projector to supply a projected light.

The reflection factor characteristic of the screen 100 will be described below. The reflection factor characteristic of the screen 100 depends on the spectral distribution of projected light. Therefore, first, the configuration of the projector 300 to project a projected light onto the screen 100 will be explained. FIG. 3 shows a schematic configuration of the projector 300. Solid-state light-emitting elements, for example, LED are used as light sources. A LED 301R for the R light supplies the R light. The R light illuminates a spatial light modulator 302R for the R light. For example, a transmission-type liquid-crystal panel can be used as the spatial light modulator 302R for the R light. The spatial light modulator 302R for the R light modulates the R light according to the image signal and emits it. The modulated R light falls on a cross-dichroic prism 304.

A LED 301G for the G light supplies the G light. The G light illuminates a spatial light modulator 302G for the G light. The spatial light modulator 302G for the G light modulates the G light according to the image signal and emits it. The modulated G light falls on a cross-dichroic prism 304. Similarly, a LED 301B for the B light supplies the B light. The B light illuminates a spatial light modulator 302B for the B light. The spatial light modulator 302B for the B light modulates the B light according to the image signal and emits it. The modulated G light falls on a cross-dichroic prism 304. The cross-dichroic prism 304 synthesizes the modulated color lights and emits them. The projection lens 305 then projects the modulated light onto the screen 100.

Figures 1, 4:
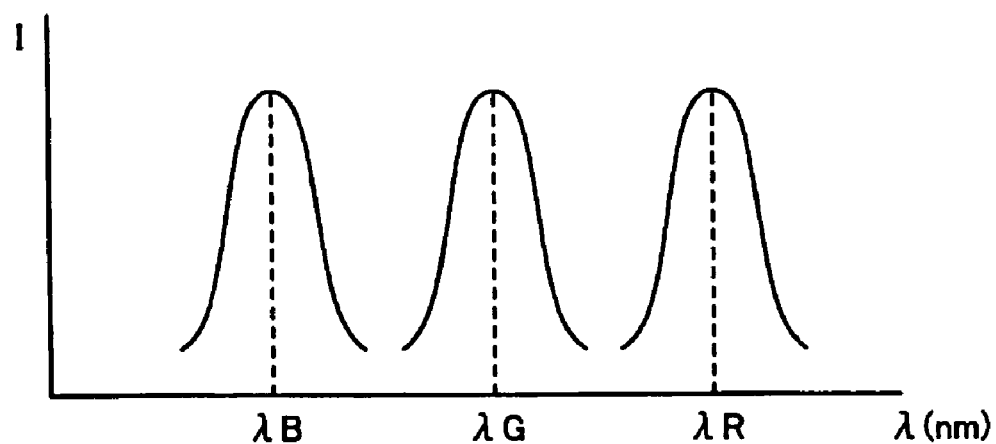
Figures 2, 4:
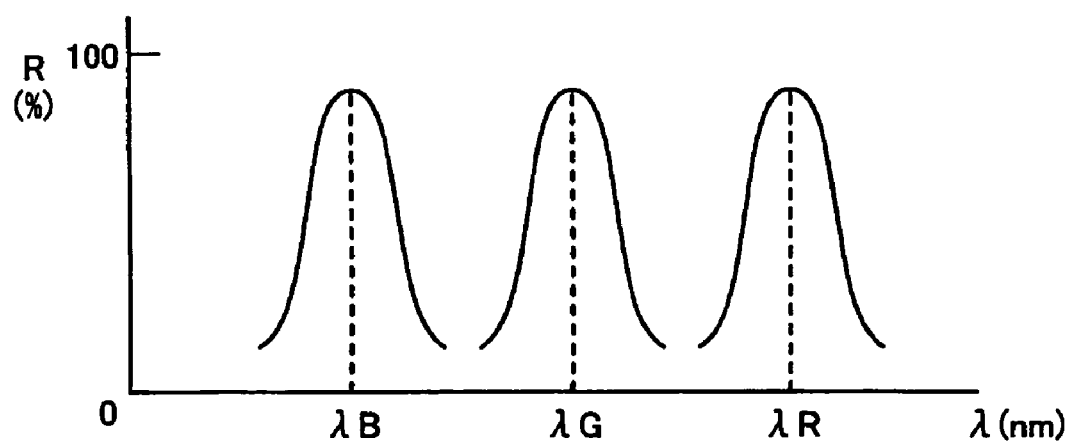

FIG. 4-1 shows a spectral distribution of the illumination light from the LED 301R, 301G, 301B for each color light. In FIG. 4-1, a wavelength, $\lambda$ (nm), is plotted against the abscissa, and an arbitrary intensity I is plotted against the ordinate. The illumination light from LED 301R, 301G, 301B for color lights is a light with the so-called peaky wavelength distribution, specifically, a comparatively dull spectral distribution with the prescribed wavelength width around the respective peak wavelengths $\lambda R$, $\lambda G$, $\lambda B$ as centers. The reflection factor characteristics of the first reflecting layer 106R, second reflecting layer 106G, and third reflecting layer 106B formed on the beads 103 are shown in FIG. 4-2. In FIG. 4-2, a wavelength, λ (nm), is plotted against the abscissa, and the reflection factor, R (%), is plotted against the ordinate. The comparison of FIG. 4-1 and FIG. 4-2 shows that the first reflecting layer 106R has a reflection factor characteristic such that the highest reflection factor is at a wavelength λR and the R light from the LED 301R for the red light is reflected with the highest efficiency. Similarly, the second reflecting layer 106G and the third reflecting layer 106B have reflection factor characteristics such that the G light and B light from the LED 301G for the G light and the LED 301B for the B light, respectively, are reflected with the highest efficiency.

As a result, of the light projected on the screen 100, the R light, G light, and B light, which are the lights in specific wavelength regions necessary to form a full-color image, are reflected toward the viewer with good efficiency. Further, the unnecessary outer light, such as indoor illumination light or sunlight coming from the window, generally has a spectral distribution over a wide wavelength region, specifically, a spectral distribution close to that of white light. Therefore, in the screen 100, of the unnecessary outer light, the components other than the R light, G light, and B light, can be transmitted to the side opposite to the viewer. Therefore, the quantity of outer light reflected from the screen 100 can be greatly reduced by comparison with that of the related art technology. Further, as described hereinabove, the projected light from the projector 300 can be reflected toward the viewer with good efficiency. Therefore, in addition to displaying a high-brightness projected image inherent to the bead screen itself, a projected image of even higher contrast can be obtained.

Further, if the base material 101 is composed of a light-absorbing member, then the unnecessary outer light that passed through the beads 103 will be absorbed by the light-absorbing member and will not be reflected. The light-absorbing member, for example, can be composed of a color-absorbing layer or a member painted black. As a result, a projected image of even higher contrast can be obtained.

Exemplary Embodiment 2

Figure 5:
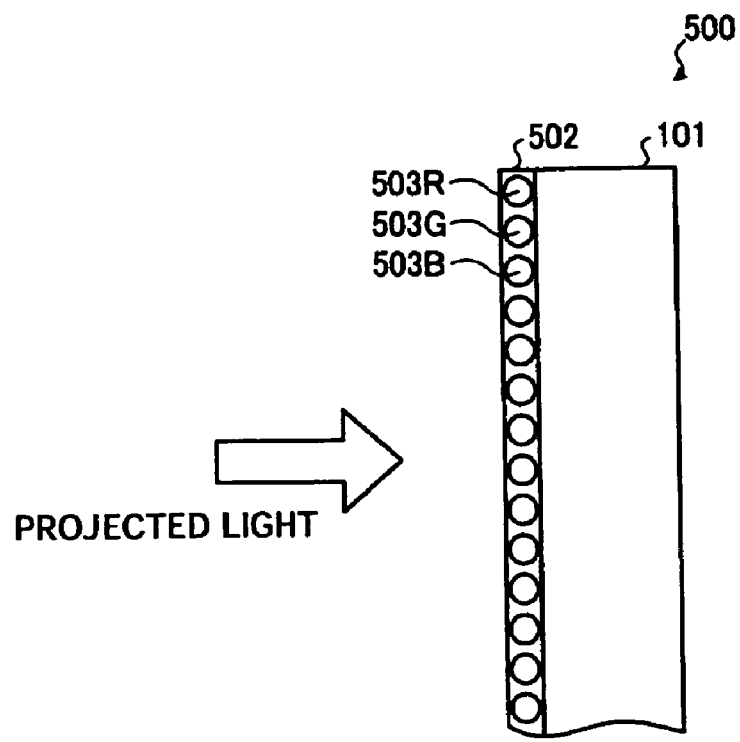
FIG. 5 shows a schematic of a screen of exemplary embodiment 2.

FIG. 5 shows a schematic of a screen 500 of exemplary embodiment of the present invention. Components identical to those of exemplary embodiment 1 are assigned with identical symbols and redundant explanation thereof is omitted. The screen is composed of a bead layer 502 and a base material 101 in the order of description from the projected light incidence side. In the bead layer 502, a plurality of beads 503R, 503G, and 503B are formed so as to be distributed almost uniformly and randomly.

Figure 6:
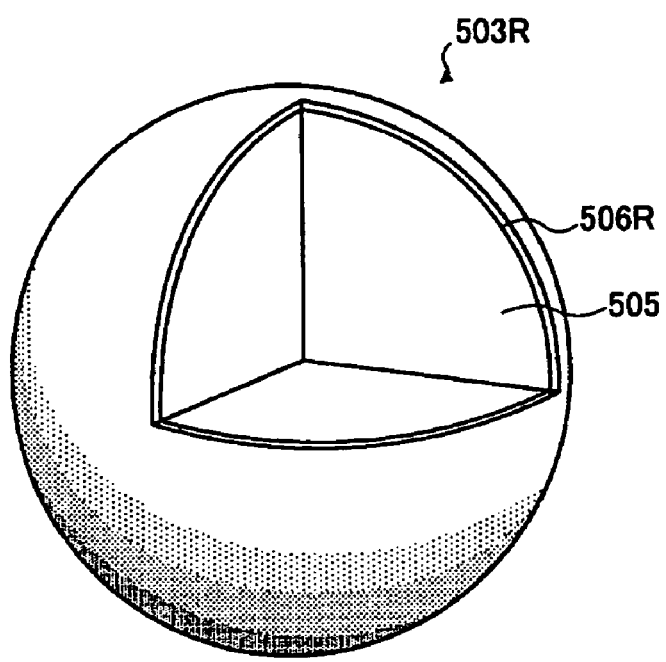
FIG. 6 is a schematic of a bead of exemplary embodiment 2.

FIG. 6 shows a schematic of a first bead 503R. The first bead 503R is in the form of a sphere with a diameter from one to several tens of microns. The bead has a core portion 505 composed of an optical glass or optically transparent resin and a first reflecting layer 506R formed thereon. The first reflecting layer 506R reflects the R light and transmits the G light and B light. The second bead 503G has a similar configuration and is, therefore, not shown in the figure. In this bead, a second reflecting layer is formed on the core portion. The second reflecting layer reflects the G light and transmits the R light and B light. The third bead 503B has a third reflecting layer formed on the core portion. The third reflecting layer reflects the B light and transmits the R light and G light. Further, as shown in FIG. 5, the three beads 503R, 503G, 503B are disposed so as to be almost uniformly and randomly distributed without gaps in the monolayer bead layer 502. The beads 503R, 503G, 503B are fixedly attached to the base material 101 with an optically transparent adhesive. In this example, one reflecting layer may be formed on each bead. Therefore, the beads can be easily manufactured.

Exemplary Embodiment 3

Figure 7:
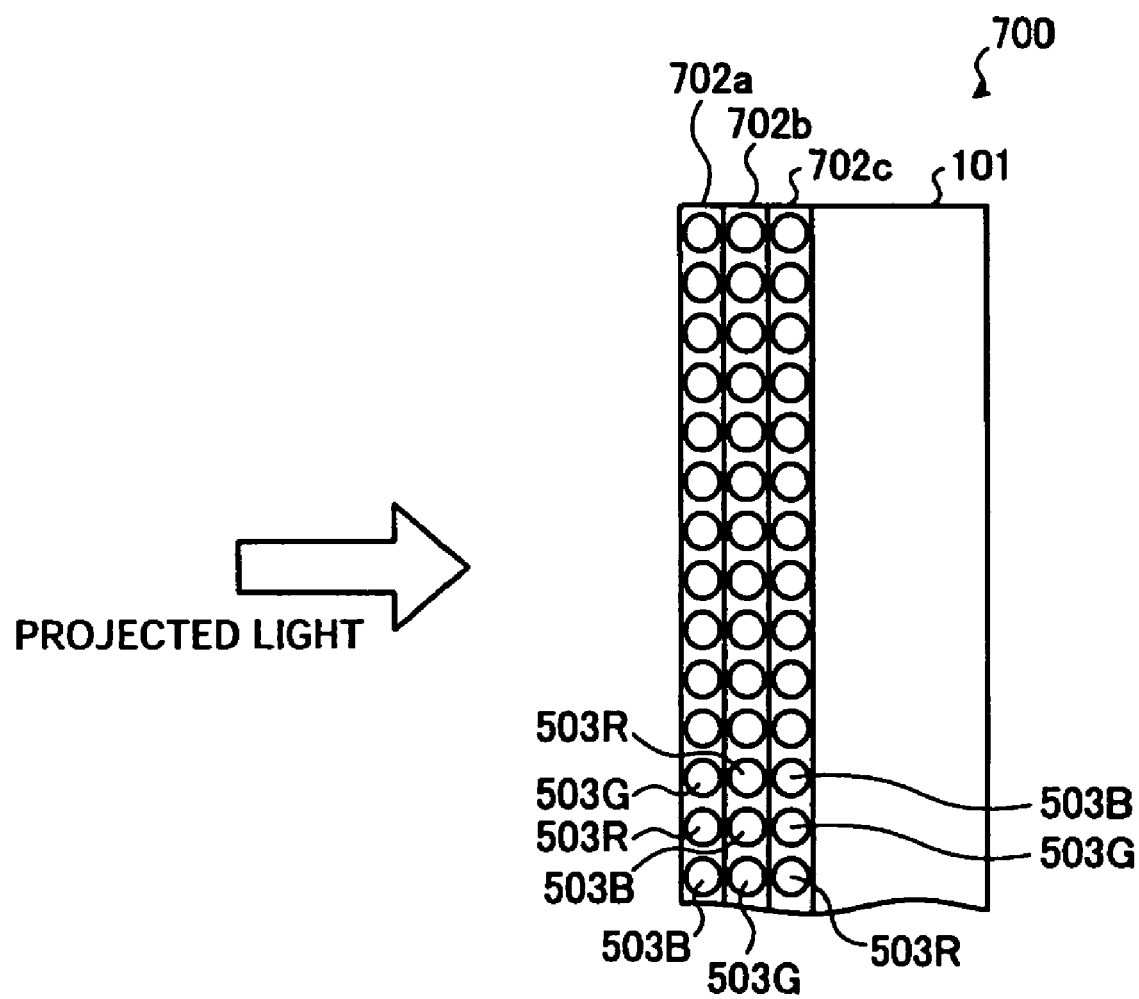
FIG. 7 shows a schematic of a screen of exemplary embodiment 3.

FIG. 7 shows a schematic of a screen 700 of exemplary embodiment 3 of the present invention. Components identical to those of exemplary embodiments 1 and 2 are assigned with identical symbols and redundant explanation thereof is omitted. The screen is composed of a first bead layer 702a, a second bead layer 702b, a third bead layer 702C and a base material 101 in the order of description from the projected light incidence side. A plurality of beads 503R, 503G, and 503B are formed so as to be distributed almost uniformly and randomly in each bead layer 702a, 702b, 702c. Here, the projected light propagates from left to right, as shown in FIG. 7, and passes through the bead layers 702a, 702b, 702c. At this time, the beads 503R, 503G, and 503B are disposed so that the projected light passes through the beads 503R, 503G, and 503B reflecting each color. For example, first, the projected light falls on the beads 503B in the first bead layer 702a. The projected light transmitted through the beads 503B falls on the beads 503G located in the second bead layer 702b. The projected light that passed through the beads 503G falls on the beads 503R located in the third bead layer 702c. The projected light that passed through the beads 503R falls on the base material 101. With such a configuration, the projected light with a spectral distribution shown in FIG. 4-1 is reflected almost uniformly in any position in the plane of the screen 700. Further, the number of bead layers is not limited to three and four or more layers may be provided.

In the above-described examples, the explanation was conducted with respect to a projected light having a comparatively peaky spectral distribution obtained with a LED as a light source. However, the present invention is not limited to such a projected light and is also applicable to a projected light from a projector with a configuration such that spatial light modulators for each color are illuminated by an illumination light from a light source supplying white light, for example, a high-pressure mercury lamp or the like, after the illumination light has been color separated with a color separation optical system. Furthermore, the spatial light modulator of the projector is not limited to a liquid-crystal panel and may be also a DMD (manufactured by Texas Instruments, Inc.).

INDUSTRIAL FIELD OF APPLICATION

As described hereinabove, the screen in accordance with exemplary aspects of the present invention is useful for projecting the projected light from a projector.

What is claimed is:

1. A screen, comprising:
a base material; and
a reflective layer formed on a light incidence side of the base material,
the reflecting layer reflecting light in a specific wavelength region and transmitting light in other wavelength regions different from the specific wavelength region,
the reflecting layer being composed of a first reflecting layer, a second reflecting layer, and a third reflecting layer, the first reflecting layer reflecting a first color light and transmitting a second color light and a third color light, the second reflecting layer reflecting the second color light and transmitting the first color light and the third color light, the third reflecting layer reflecting the third color light and transmitting the first color light and the second color light, the first reflecting layer being formed on the surface of a first bead, the second reflecting layer being formed on the surface of a second bead, the third reflecting layer being formed on the surface of a third bead, the first, second and third beads being provided in a plurality of laminated layers, and each of the plurality of laminated layers containing a plurality of the first, second and third beads.

2. The screen according to claim 1, the first, second and third beads being optically transparent and substantially uniformly distributed on the base material.

3. The screen according to claim 1, the reflecting layer being composed of a dielectric multi-layer film.

4. A projector including the screen according to claim 1, light being projected onto the screen.

5. The projector according to claim 4, the first, second and third beads being optically transparent and substantially uniformly distributed on the base material.

6. The projector according to claim 4, the reflecting layer being composed of a dielectric multi-layer film.

* * * * *